United States Patent
Wu (10) Patent No.: US 12,382,510 B2
(45) Date of Patent: Aug. 5, 2025

(54) RANDOM ACCESS METHOD, RANDOM ACCESS PROCESSING METHOD, TERMINAL, AND NETWORK DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 397 days.

(21) Appl. No.: 17/948,196

(22) Filed: Sep. 19, 2022

(65) Prior Publication Data

US 2023/0009965 A1    Jan. 12, 2023

Related U.S. Application Data

(63) Continuation of application No. PCT/CN2021/082646, filed on Mar. 24, 2021.

(30) Foreign Application Priority Data

Mar. 24, 2020   (CN) .......................... 202010214538.8

(51) Int. Cl.
*H04W 74/0833* (2024.01)
*H04B 17/318* (2015.01)
*H04W 24/10* (2009.01)

(52) U.S. Cl.
CPC ...... *H04W 74/0841* (2013.01); *H04B 17/318* (2015.01); *H04W 24/10* (2013.01)

(58) Field of Classification Search
None
See application file for complete search history.

(56) References Cited

U.S. PATENT DOCUMENTS 10,701,734 B2 *  6/2020  Shih ..................... H04W 24/10
10,813,137 B2 * 10/2020  Shih ..................... H04W 16/32
(Continued)

FOREIGN PATENT DOCUMENTS

CN       107635242 A    1/2018
CN       107734600 A    2/2018
(Continued)

OTHER PUBLICATIONS

International Search Report issued in corresponding International Application No. PCT/CN2021/082646, mailed Jun. 8, 2021, 4 pages.
(Continued)

*Primary Examiner* — Hassan A Phillips
*Assistant Examiner* — Gautam Sharma
(74) *Attorney, Agent, or Firm* — IPX PLLC (57) ABSTRACT

A random access method, a random access processing method, a terminal, and a network device. The method includes: receiving first configuration information, where the first configuration information is used for indicating a related configuration for performing a random access process based on a target transmission node; and initiating the random access process to the target transmission node based on the first configuration information. The terminal is configured with a target object corresponding to N transmission nodes, the target object is a serving cell or a bandwidth part, and N is an integer greater than 1. The target transmission node is any one of the N transmission nodes.

17 Claims, 4 Drawing Sheets

Receive first configuration information, where the first configuration information is used for indicating a related configuration for performing a random access process based on a target transmission node — 201

Initiate the random access process to the target transmission node based on the first configuration information — 202

(56) References Cited

U.S. PATENT DOCUMENTS

| | | | | |
|---|---|---|---|---|
| 10,999,870 B2* | 5/2021 | Ou | ............... | H04W 74/002 |
| 11,582,807 B2* | 2/2023 | Wei | ............... | H04W 80/02 |
| 11,659,600 B2* | 5/2023 | Cozzo | ............... | H04L 1/08 370/328 |
| 2018/0020487 A1 | 1/2018 | Tsai et al. | | |
| 2018/0049137 A1* | 2/2018 | Li | ............... | H04W 52/242 |
| 2019/0254074 A1* | 8/2019 | Jeon | ............... | H04W 36/0085 |
| 2021/0007146 A1* | 1/2021 | Agiwal | ............... | H04W 76/15 |
| 2021/0227587 A1* | 7/2021 | Tsai | ............... | H04W 76/27 |
| 2021/0250989 A1* | 8/2021 | Chin | ............... | H04W 74/006 |
| 2021/0378027 A1* | 12/2021 | Wang | ............... | H04W 74/0836 |
| 2022/0086841 A1* | 3/2022 | Agiwal | ............... | H04W 24/10 |
| 2022/0287107 A1* | 9/2022 | Kim | ............... | H04W 72/0446 |
| 2023/0284279 A1* | 9/2023 | Zhou | ............... | H04W 74/006 370/328 |

FOREIGN PATENT DOCUMENTS

| | | |
|---|---|---|
| CN | 109076412 A | 12/2018 |
| CN | 109392188 A | 2/2019 |
| CN | 109906661 A | 6/2019 |
| CN | 110856276 A | 2/2020 |
| EP | 3528582 A1 | 8/2019 |
| EP | 3874812 A1 | 9/2021 |

OTHER PUBLICATIONS

ZTE Corporation, Sanechips, "Draft-Running MAC CR for 2-step RACH", 3GPP TSG-RAN WG2 Meeting #109-e, R2-2000996, Feb. 2020.

Catt, "Random access procedure in NR", 3GPP TSG-RAN WG2 Meeting #96, R2-167951, Nov. 2016.

First Office Action issued in related Chinese Application No. 202010214538.8, mailed Aug. 24, 2022, 12 pages.

Catt, "Design Principles for Random Access Procedure in NR", 3GPP TSG-RAN WG2 Meeting #97, R2-1700969, Feb. 2017, 3 pages.

Second Office Action issued in related Chinese Application No. 202010214538.8, mailed Mar. 23, 2023, 11 pages.

Extended European Search Report issued in related European Application No. 21775545.3, mailed Aug. 29, 2023, 12 pages.

CMCC, "Consideration of Beamforming for NR Conditional Handover", 3GPP Draft, R2-1905949, May 2021, 3 pages.

* cited by examiner

FIG. 1

Receive first configuration information, where the first configuration information is used for indicating a related configuration for performing a random access process based on a target transmission node — 201

Initiate the random access process to the target transmission node based on the first configuration information — 202

FIG. 2

Send first configuration information to a terminal, where the first configuration information is used for indicating a related configuration for performing a random access process based on a target transmission node, so that the terminal initiates the random access process to the target transmission node based on the first configuration information — 301

RANDOM ACCESS METHOD, RANDOM ACCESS PROCESSING METHOD, TERMINAL, AND NETWORK DEVICE

CROSS-REFERENCE TO RELATED APPLICATIONS

This application is a continuation of International Application No. PCT/CN2021/082646, filed Mar. 24, 2021, which claims priority to Chinese Patent Application No. 202010214538.8, filed Mar. 24, 2020. The entire contents of each of the above-referenced applications are expressly incorporated herein by reference.

TECHNICAL FIELD

The present disclosure relates to the field of communications technologies, and in particular, to a random access method, a random access processing method, a terminal, and a network device.

BACKGROUND

It is well known that, currently, in a New Radio (NR) system, in a case that only one transmission node (Transmission Reception Point, TRP) is configured for one serving cell or a Bandwidth Part (BWP), a random access process is defined as follows:

After a UE initiates the random access process, for a cell that initiates the random access process, in a case that a plurality of uplink carriers are configured, and an RSRP result of the cell is less than a threshold configured by a network, the UE then selects an SUL carrier to initiate the random access process, otherwise the UE selects an NUL carrier. For example, the cell is a PCell, and the plurality of uplink carriers may include a Supplementary Uplink (SUL) carrier and a Normal UL (NUL) carrier, and the threshold may be configured through a parameter rsrp-ThresholdSSB-SUL.

In a case that different random access resources of a selected random access process type correspond to different downlink reference signals, for example, the downlink reference signals may include a Synchronization Signal and PBCH block (SSB) and/or a Channel State Information Reference Signal (CSI-RS). In a case that an RSRP of a reference signal measured by the UE exceeds the threshold configured by the network, the UE selects a random access resource corresponding to the reference signal to initiate the random access process.

In a 2-step random access channel (2-step RACH) process, the UE sends an MsgA and receives an MsgB message fed back by a network side, and the MsgA may include a Physical Random Access Channel (PRACH) and a Physical Uplink Shared Channel (PUSCH).

In a 4-step RACH process, for a contention random access process, the UE sends an Msg1, then receives an Msg2 sent by the network side, then sends an Msg3 according to an uplink authorization provided in a random access response, and finally determines, according to an information content of a received Msg4, whether a contention of the random access process is resolved. The Msg1 may be a PRACH, and the Msg2 may be a Random Access Response (RAR) message.

In the 4-step RACH process, for a non-contention random access process, the UE sends the Msg1 (PRACH), and then determines, according to an information content of the received Msg2, whether the contention of the random access process is resolved.

However, currently, it is proposed to configure a plurality of transmission nodes for one serving cell. In a case that the plurality of transmission nodes are configured in the one serving cell, how to perform a random access process according to different transmission nodes becomes an urgent problem to be resolved.

SUMMARY

Embodiments of the present disclosure provide a random access method, a random access processing method, a terminal, and a network device.

According to a first aspect, an embodiment of the present disclosure provides a random access method, performed by a terminal, the method including:
   receiving first configuration information, where the first configuration information is used for indicating a related configuration for performing a random access process based on a target transmission node; and
   initiating the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

According to a second aspect, an embodiment of the present disclosure provides a random access processing method, performed by a network device, the method including:
   sending first configuration information to a terminal, where the first configuration information is used for indicating a related configuration for performing a random access process based on a target transmission node, so that the terminal initiates the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

According to a third aspect, an embodiment of the present disclosure provides a terminal, including:
   a receiving module, configured to receive first configuration information, where the first configuration information is used for indicating a related configuration for performing a random access process based on a target transmission node; and
   a control module, configured to initiate the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

According to a fourth aspect, an embodiment of the present disclosure provides a network device, including:
   a sending module, configured to send first configuration information to a terminal, where the first configuration information is used for indicating a related configuration for performing a random access process based on a target transmission node, so that the terminal initiates the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

According to a fifth aspect, an embodiment of the present disclosure provides a terminal, including: a memory, a processor, and a program stored on the memory and executable by the processor, where the program, when executed by the processor, implements the steps of the random access method described above.

According to a sixth aspect, an embodiment of the present disclosure provides a network device, including: a memory, a processor, and a program stored on the memory and executable by the processor, where the program, when executed by the processor, implements the steps of the random access processing method described above.

According to a seventh aspect, an embodiment of the present disclosure provides a computer-readable storage medium, storing a computer program, where the computer program, when executed by a processor, implements the steps of the random access method described above, or the steps of the random access processing method described above.

In the embodiments of the present disclosure, first configuration information is received, the first configuration information is used for indicating a related configuration for performing a random access process based on a target transmission node, and a random access process is initiated to the target transmission node based on the first configuration information. In this way, the embodiments of the present disclosure implement a random access process based on a plurality of transmission nodes, thereby increasing a rate of a successful random access.

BRIEF DESCRIPTION OF THE DRAWINGS

To describe the technical solutions of the embodiments of the present disclosure more clearly, the following briefly introduces the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative efforts.

DETAILED DESCRIPTION

The technical solutions in embodiments of the present disclosure are described clearly below with reference to the accompanying drawings. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the specification and claims of this application, the term "include" and any variants thereof are intended to cover a non-exclusive inclusion. For example, a process, method, system, product, or device that includes a series of steps or units is not necessarily limited to those steps or units that are clearly listed, but may include other steps or units not clearly listed or inherent to such a process, method, product, or device. In addition, the use of "and/or" in the description and the claims means at least one of the connected objects, for example, three conditions such as A and/or B, indicating including A alone, B alone, and both A and B present. "At least one of A and B" also indicates that there are three conditions, including A alone, B alone, and both A and B present.

In the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. In particular, the terms such as "exemplary" and "example" as used herein are intended to present the related concept in a specific implementation.

The embodiments of the present disclosure are described below with reference to the accompanying drawings. A random access method, a random access processing method, a terminal, and a network device provided in the embodiments of the present disclosure may be applied to a wireless communications system. The wireless communications system may be a fifth-generation (5G) communications system, or an evolved Long Term Evolution (eLTE) system, or a subsequent evolved communications system.

Figure 1:
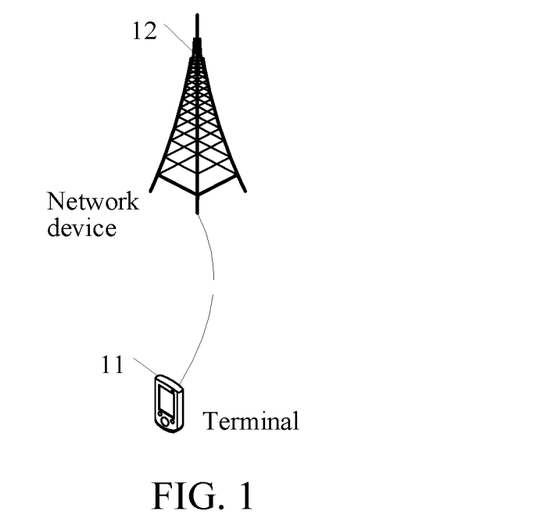
FIG. 1 is a structural diagram of a network system to which an embodiment of the present disclosure can be applied.

FIG. 1 is a structural diagram of a network system to which an embodiment of the present disclosure can be applied. As shown in FIG. 1, the network system includes a terminal 11 and a network device 12. The terminal 11 may be a user terminal or another terminal-side device, such as a mobile phone, a tablet computer, a laptop computer, a personal digital assistant, a mobile Internet device or a wearable device. It should be noted that, the type of the terminal 11 is not limited in this embodiment of the present disclosure. The network device 12 described above may be a 5G base station, or a base station of a later version, or a base station in another communications system, or referred to as a Node B, an evolved Node B, or a Transmission Reception Point (TRP), or an Access Point (AP), or another term in the art as long as the same technical effects are achieved, and the network device is not limited to a specific technical term. In addition, the network device 12 described above may be a Master Node (MN) or a Secondary Node (SN). It should be noted that, in this embodiment of the present disclosure, only the 5G base station is used as an example, but the specific type of the network device is not limited.

For the convenience of understanding, some contents involved in the embodiments of the present disclosure are described below:

1. Carrier Aggregation (CA)

A terminal (User Equipment, UE) may be configured to work under a plurality of different frequencies at the same time, that is, work under carriers (Component Carrier, CC) of different Absolute Radio Frequency Channel Number (ARFCN). The CA includes one Primary Cell (PCell) and one or more Secondary Cell (SCell). Each carrier is a specific serving cell, is configured with a corresponding serving cell identifier (for example, servingCellId), and corresponds to one Hybrid Automatic Repeat Request (HARQ) entity, and the HARQ entity includes a plurality of HARQ processes. The configuration of one serving cell includes a common configuration (common cell configuration) applicable to all UEs in the cell and a dedicated configuration (dedicated cell configuration) applicable to a specific UE.

2. BWP

For a specific cell, a network device can configure up to 4 BWPs, corresponding to different operating frequency ranges. The network device may indicate an activated BWP through Downlink Control Information (DCI) signaling. For a specific cell, a UE can only have one activated BWP at the same time.

Figure 2:
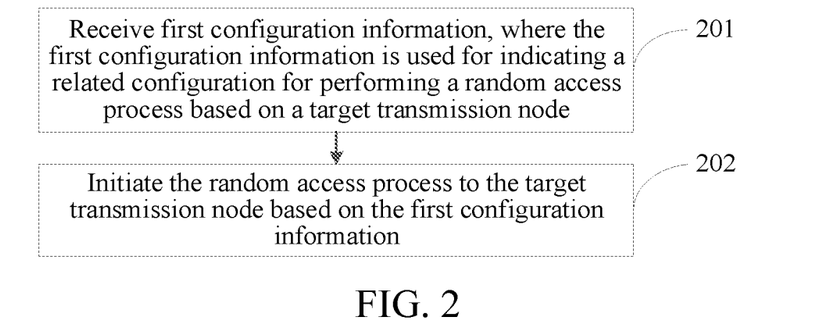
FIG. 2 is a flowchart of a random access method according to an embodiment of the present disclosure.

FIG. 2 is a flowchart of a random access method according to an embodiment of the present disclosure. The method is performed by a terminal, and as shown in FIG. 2, includes the following steps:

Step 201: Receive first configuration information, where the first configuration information is used for indicating a related configuration for performing a random access process based on a target transmission node.

Step 202: Initiate the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

In this embodiment of the present disclosure, the first configuration information described above is configured by a network device. In some embodiments, the first configuration information may be a common configuration for all transmission nodes of a target object, or may be understood as a dedicated configuration for a specific transmission node, where the specific transmission node is the target transmission node described above.

In some embodiments, the TRP described above may be understood as a transmission reception point, and the network device may configure N TRPs corresponding to one target object for the terminal. For example, a serving cell 1 (serving cell-1) may be configured with a plurality of TRPs for the terminal, and a BWP-1 may also be configured with a plurality of TRPs for the terminal.

The target transmission node described above may be indicated by the network device based on N TRPs, or may be selected by the terminal from the N TRPs according to a specific rule.

In the embodiments of the present disclosure, first configuration information is received, the first configuration information is used for indicating a related configuration for performing a random access process based on a target transmission node, and a random access process is initiated to the target transmission node based on the first configuration information. In this way, the embodiments of the present disclosure implement a random access process based on a plurality of transmission nodes, thereby increasing a rate of a successful random access.

It should be noted that, the manner in which the network device configures the N TRPs may be set according to actual needs. For example, in an embodiment, the method further includes:

receiving second configuration information, where the second configuration information carries a physical identifier corresponding to each transmission node, where the physical identifier includes at least one of the following:

a Physical Cell Identifier (PCI), such as a PCI-1;

a Reference Signal Identifier (RSI), such as an SSB-1 and/or a CSI-RS-1;

a port number identifier corresponding to a reference signal, such as a port 1 (port_1);

a resource position identifier of a control channel, such as an identifier of a Control Resource Set (CORESET) and/or an identifier of a search space of a Physical Downlink Control Channel (PDCCH);

a reference signal identifier of the control channel, such as an SSB-1 and/or a CSI-RS-1; or a port number identifier corresponding to a reference signal of the control channel, such as a port 1 (port_1).

It should be understood that, in an embodiment, in a case that the physical identifier includes any one of the items described above, an identifier may be used as the physical identifier of the transmission node. An example in which the physical cell identifier is the physical identifier of the transmission node is used for description. For example, four different transmission nodes may be identified by a PCI-1, a PCI-2, a PCI-3, and a PCI-4 respectively.

In another embodiment, in a case that the physical identifier includes a plurality of items described above, a combination of the plurality of items may be used as the physical identifier of the transmission node. In an optional embodiment, in a case that the physical identifier of the transmission node is jointly formed by a PCI and an SSB, one transmission node may be indicated by a PCI-1 and an SSB-1, and another transmission node may be indicated by a PCI-2 and an SSB-2.

In some embodiments, the first configuration information described above includes at least one of the following:

a Downlink Path Loss Reference Signal (PL RS), such as an SSB-1 of a PCI-1;

a measurement threshold for a selection of an uplink carrier, such as an rsrp-ThresholdSSB-SUL of the PCI-1;

a measurement threshold for a selection of a random access process type, such as an msgA-RSRP-Threshold for an NUL carrier and/or an msgA-RSRP-Threshold-SUL for an SUL carrier of the PCI-1; or a measurement threshold of a reference signal corresponding to a random access resource, such as an rsrp-ThresholdSSB and/or an rsrp-ThresholdCSI-RS of the PCI-1.

It should be noted that, the manner for determining a target TRP may be set according to actual needs. For example, in an embodiment, the target TRP may be indicated by a network device and determined by a terminal according to a rule. In a case that the target TRP is indicated by the network device, the first configuration information described above is a dedicated configuration for the target TRP, for example, the downlink path loss reference signal is a downlink path loss reference signal of the target TRP. In a case that the target TRP is determined by the terminal according to the rule, the first configuration information described above may be a configuration shared by all TRPs, or may include a configuration corresponding to each TRP. The two manners in which the target TRP is indicated by the network device and determined by the terminal according to the rule are described below in detail.

Manner 1: The target TRP is indicated by the network device.

In this embodiment, the first configuration information is further used for indicating the target transmission node. That is, the first configuration information may carry the physical identifier of the target transmission node.

For example, the network device may specify a transmission node of a PCI-1 of a target PCell in a switch command to be used for a random access process, or may specify, in a System Information Block (SIB) 1, a transmission node of a PCI-1 of an initial access cell to be used for a random access process of an initial access.

In a case that the network device indicates the target transmission node, the random access process satisfies at least one of the following:

using a measurement result of the downlink path loss reference signal of the target transmission node as a measurement result for the random access process;

using, in a case that an RSRP measurement value of a reference signal received power of the target transmission node is less than a first preset threshold, a supplementary uplink to initiate the random access process;

using, in a case that the RSRP measurement value of the target transmission node is greater than or equal to the first preset threshold, a normal uplink to initiate the random access process;

using, in a case that the RSRP measurement value of the target transmission node is greater than a second preset threshold, a 2-step physical random access channel to initiate the random access process;

using, in a case that the RSRP measurement value of the target transmission node is less than or equal to the second preset threshold, a 4-step physical random access channel to initiate the random access process; or using, in a case that an RSRP of a target signal is greater than or equal to a third preset threshold, a random access resource corresponding to the target signal to initiate the random access process, where the target signal is a downlink signal corresponding to a random access resource of the target transmission node.

The first preset threshold, the second preset threshold, and third preset threshold described above may all be configured by the network device. The first preset threshold described above may be understood as a value indicated by the rsrp-ThresholdSSB-SUL, the second preset threshold described above may be understood as a value indicated by the msgA-RSRP-Threshold, and the third preset threshold described above may be understood as a value indicated by the rsrp-ThresholdSSB. The selection of the supplementary uplink to initiate the random access process described above may be understood as initiating the random access process based on a carrier of the supplementary uplink; and the selection of the normal uplink to initiate the random access process described above may be understood as initiating the random access process based on a carrier of the normal uplink.

In other words, in this embodiment, the behavior of a UE includes at least one of the following:

using a measurement result of the downlink path loss reference signal of the target transmission node as a measurement result for the random access process;

selecting an SUL in a case that an RSRP measurement value of the target transmission node is less than a first threshold value configured by the network device, otherwise, selecting an NUL;

selecting a 2-step RACH in a case that the RSRP measurement value of the target transmission node is greater than a second threshold value configured by the network device, otherwise, selecting a 4-step RACH; or selecting, in a case that an RSRP of a downlink signal corresponding to a random access resource of the target transmission node exceeds a third threshold value configured by the network device, the random access resource corresponding to the downlink signal to initiate the random access process.

Manner 2: The target TRP is determined by the terminal according to the rule.

In this embodiment, it may be configured by the network device or agreed in a protocol that it is determined based on a target rule that the target transmission node is determined among N transmission nodes, and the target rule may be agreed in the protocol or configured by the network device. The target rule includes rule information for selecting a transmission node for the random access process. In some embodiments, before the initiating the random access process to the target transmission node based on the first configuration information, the method further includes:

determining the target transmission node according to a target rule agreed in a protocol or configured by a network device.

In some embodiments, the target rule includes any one of the following:

the target transmission node is a transmission node with a best measurement result among N transmission nodes;

the target transmission node is any one of M transmission nodes, the M transmission nodes are transmission nodes whose measurement results are greater than or equal to a first preset value among the N transmission nodes, and M is a positive integer less than or equal to N;

the target transmission node is a preset transmission node among the N transmission nodes in a case that a measurement result of the target object is greater than or equal to a second preset value; or the target transmission node is the preset transmission node among the N transmission nodes in a case that the measurement result of the target object is less than or equal to a third preset value.

In this embodiment, the measurement result described above may be understood as an RSRP measurement result. The measurement result of the target transmission node described above may be understood as an RSRP measurement result of any transmission node in the target transmission node, or an RSRP measurement result of a specified transmission node, or an average value of RSRP measurement results of a plurality of transmission nodes, or a maximum value of the RSRP measurement results of the plurality of transmission nodes, or a minimum value of the RSRP measurement results of the plurality of transmission nodes, or a weighted value calculated according to the RSRP measurement results of the plurality of transmission nodes according to a preset method, such as arithmetic mean, geometric mean, harmonic mean, square mean, weighted mean, min maximization, max minimization and other combinations and simple variations.

In this embodiment of the present disclosure, in a case that a plurality of different transmission nodes are configured for a specific serving cell or a BWP of the terminal, a specific random access resource (that is, the random access resource of the target transmission node described above) is selected according to downlink measurement results of the plurality of transmission nodes to initiate a random access process, so that a network side and a UE side can maintain the understanding of a random access signal quality, and a rate of a successful random access is increased.

In an embodiment, a time at which the terminal determines the target transmission node may satisfy any one of the following:

before a selection of an uplink carrier;
after the selection of the uplink carrier, and before a selection of a random access process type;
after the selection of the random access process type, and before a selection of a downlink reference signal corresponding to a random access resource; or
after the selection of the downlink reference signal corresponding to the random access resource.

It should be noted that, in a case that the terminal determines the target transmission node at different time points, the corresponding behavior of the terminal may be different, which is described in detail below.

Solution 1: In a case that the time of determining the target transmission node is after the selection of the uplink carrier and before the selection of the random access process type, the random access process satisfies at least one of the following:

using, in a case that an RSRP measurement value of a reference signal received power of the target transmission node is less than a first preset threshold, a supplementary uplink to initiate the random access process; or
using, in a case that the RSRP measurement value of the target transmission node is greater than or equal to the first preset threshold, a normal uplink to initiate the random access process.

In this solution, the first preset threshold described above may be configured by the network device, for example, may be indicated by a parameter rsrp-ThresholdSSB-SUL. In other words, the first preset threshold described above is understood as a value indicated by the rsrp-ThresholdSSB-SUL.

Solution 2: In a case that the time of determining the target transmission node is after the selection of the random access process type and before the selection of the downlink reference signal corresponding to the random access resource, the random access process satisfies at least one of the following:

using, in a case that the RSRP measurement value of the target transmission node is greater than a second preset threshold, a 2-step physical random access channel to initiate the random access process; or
using, in a case that the RSRP measurement value of the target transmission node is less than or equal to the second preset threshold, a 4-step physical random access channel to initiate the random access process.

In this solution, the second preset threshold described above may be configured by the network device, for example, may be indicated by a parameter msgA-RSRP-Threshold. In other words, the second preset threshold described above is understood as a value indicated by the msgA-RSRP-Threshold.

Solution 3: In a case that the time of determining the target transmission node is after the selection of the downlink reference signal corresponding to the random access resource, the random access process satisfies the following:

using, in a case that an RSRP of a target signal is greater than or equal to a third preset threshold, a random access resource corresponding to the target signal to initiate the random access process, where the target signal is a downlink signal corresponding to a random access resource of the target transmission node.

In this solution, the third preset threshold described above may be configured by the network device, for example, may be indicated by a parameter rsrp-ThresholdSSB. In other words, the third preset threshold described above is understood as a value indicated by the rsrp-ThresholdSSB.

Solution 4: Whenever the target transmission node is determined, the random access process may satisfy the following: using a measurement result of the downlink path loss reference signal of the target transmission node as a measurement result for the random access process.

For better understanding of the implementation of the present disclosure, two specific implementations based on that the network device indicates the target TRP and the terminal selects the TRP according to the rule are described in detail below.

Implementation 1: The network device specifies a transmission node for the random access process.

In implementation 1, an example in which a target object is a serving cell is used for detailed description, which may include the following two steps:

Step 1: The network device configures the terminal with a plurality of transmission nodes corresponding to one serving cell, and the plurality of transmission nodes are distinguished by a plurality of different transmission node physical identifiers. For example, a transmission node physical identifier may be represented by a PCI. For example, a working frequency of a serving cell-1 is f1, and the network device configures the serving cell-1 with a plurality of transmission nodes for the terminal, which may include transmission nodes corresponding to four PCIs, including a PCI-1, a PCI-2, a PCI-3, and a PCI-4.

The "transmission node physical identifier" includes any combination of one or more of the following:

a physical cell identifier, such as a PCI-1;
a reference signal identifier, such as an SSB-1 and/or a CSI-RS-1;
a port number identifier corresponding to a reference signal, such as a port 1 (port_1);
a resource position identifier of a control channel, such as a CORESET identifier and/or a search space identifier of a PDCCH;
a reference signal identifier of the control channel, such as an SSB-1 and/or a CSI-RS-1; or
a port number identifier corresponding to a reference signal of the control channel, such as a port 1 (port_1).

In some embodiments, the network device specifies a transmission node identifier corresponding to initiating the random access process in the cell. For example, the network device specifies a transmission node of a PCI-1 of a target PCell in a switch command to be used for a random access process, or specifies, in a SIB1, a transmission node of a PCI-I of an initial access cell to be used for a random access process of an initial access.

In some embodiments, the network device may also indicate to the UE specific random access process configuration information of the transmission node used for the random access process, and the configuration information includes at least one of the following:

a downlink path loss reference signal, such as an SSB-1 of a PCI-1;
a measurement threshold for a selection of an uplink carrier, such as an rsrp-ThresholdSSB-SUL of the PCI-1;

a measurement threshold for a selection of a random access process type, such as an msgA-RSRP-Threshold for an NUL carrier and/or an msgA-RSRP-Threshold-SUL for an SUL carrier of the PCI-1; or a measurement threshold of a reference signal corresponding to a random access resource, such as an rsrp-ThresholdSSB and/or an rsrp-ThresholdCSI-RS of the PCI-1.

Step 2: The UE initiates, according to configuration information in step 1, a random access process on a specific transmission node specified by a network side, and performs the random access process according to the "specific random access process configuration information of the transmission node" configured by the network device.

In some embodiments, the behavior of the UE includes at least one of the following:

using a measurement result of the downlink path loss reference signal of the target transmission node as a measurement result for the random access process, where the downlink path loss reference signal of the target transmission node may be understood as an SSB-1 of a PCI-1;

selecting an SUL in a case that an RSRP measurement value of the target transmission node is less than a first threshold value configured by the network device, otherwise, selecting an NUL, where, for example, the first threshold value may be understood as an rsrp-ThresholdSSB-SUL of the PCI-1;

selecting a 2-step RACH in a case that the RSRP measurement value of the target transmission node is greater than a second threshold value configured by the network device, otherwise, selecting a 4-step RACH, where, for example, the second threshold value may be understood as an msgA-RSRP-Threshold of the PCI-1; or selecting, in a case that an RSRP of a downlink signal corresponding to a random access resource of the target transmission node exceeds a third threshold value configured by the network device, the random access resource corresponding to the downlink signal to initiate the random access process, where, for example, the third threshold value may be understood as an rsrp-ThresholdSSB of the PCI-1.

Implementation 2: The terminal selects a target TRP according to a specific rule to perform the random access process.

In implementation 2, an example in which a target object is a serving cell is used for detailed description, which may include the following two steps:

Step 1: The network device configures the terminal with a plurality of transmission nodes corresponding to one serving cell, and the plurality of transmission nodes are distinguished by a plurality of different transmission node physical identifiers. For example, a transmission node physical identifier may be represented by a PCI. For example, a working frequency of a serving cell-1 is f1, and the network device configures the serving cell-1 with a plurality of transmission nodes for the terminal, which may include transmission nodes corresponding to four PCIs, including a PCI-1, a PCI-2, a PCI-3, and a PCI-4.

The "transmission node physical identifier" includes any combination of one or more of the following:

a physical cell identifier, such as a PCI-1;

a reference signal identifier, such as an SSB-1 and/or a CSI-RS-1;

a port number identifier corresponding to a reference signal, such as a port 1 (port_1);

a resource position identifier of a control channel, such as a CORESET identifier and/or a search space identifier of a PDCCH;

a reference signal identifier of the control channel, such as an SSB-1 and/or a CSI-RS-1; or a port number identifier corresponding to a reference signal of the control channel, such as a port 1 (port_1).

In some embodiments, that the network device configures or the protocol agrees that the random access process is initiated in the cell is rule information for selecting a transmission node for the random access process. The rule includes any one of the following:

Method 1.1: Selecting a transmission node with the best measurement result, for example, in a case that an RSRP measurement result of a PCI-1 is the highest, selecting the PCI-1.

Method 1.2: Selecting a transmission node whose measurement result is greater than or equal to a threshold value, for example, in a case that the RSRP measurement result of the PCI-1 is greater than or equal to a threshold value configured by the network or agreed in the protocol, selecting the PCI-1.

Method 1.3: Selecting a specific transmission node in a case that a measurement result of a serving cell is greater than or equal to the threshold value, for example, in a case that an RSRP measurement result of the serving cell is greater than or equal to the threshold value configured by the network or agreed in the protocol, selecting the PCI-1.

Method 1.4: Selecting a specific transmission node in a case that a measurement result of a serving cell is less than or equal to the threshold value, for example, in a case that the RSRP measurement result of the serving cell is less than or equal to the threshold value configured by the network or agreed in the protocol, selecting the PCI-1.

In some embodiments, the network device may also indicate to the UE specific random access process configuration information of the transmission node used for the random access process, and the configuration information includes at least one of the following:

a downlink path loss reference signal of the transmission node, such as an SSB-1 of a PCI-1;

a measurement threshold for a selection of an uplink carrier of the transmission node, such as an rsrp-ThresholdSSB-SUL of the PCI-1;

a measurement threshold for a selection of a random access process type of the transmission node, such as an msgA-RSRP-Threshold for an NUL carrier and/or an msgA-RSRP-ThresholdSUL for an SUL carrier of the PCI-1; or a measurement threshold of a reference signal corresponding to a random access resource of the transmission node, such as an rsrp-ThresholdSSB and/or an rsrp-ThresholdCSI-RS of the PCI-1.

Step 2: The UE selects a transmission node according to a selection rule of a transmission node used for a random access process that is configured by the network device or agreed in the protocol.

The step of selecting, by the UE, the transmission node after triggering a random access, may satisfy any one of the following:

method 2.1: before the step of the selection of the uplink carrier;

method 2.2: after the selection of the uplink carrier, and before the selection of the random access process type;

method 2.3: after the selection of the random access process type, and before a selection of a downlink reference signal corresponding to a random access resource; or method 2.4: after the selection of the downlink reference signal corresponding to the random access resource.

The UE initiates a random access process on a selected specific transmission node, and performs the random access process according to the "specific random access process configuration information of the transmission node" configured by the network device.

In some embodiments, the behavior of the UE includes at least one of the following:

corresponding to any one of the method 2.1 to the method 2.4 described above, using a measurement result of the downlink path loss reference signal of the target transmission node as a measurement result for the random access process, where the downlink path loss reference signal of the target transmission node may be understood as an SSB-1 of a PCI-1;

corresponding to the method 2.1 described above, selecting an SUL in a case that an RSRP measurement value of the target transmission node is less than a first threshold value configured by the network device, otherwise, selecting an NUL, where, for example, the first threshold value may be understood as an rsrp-ThresholdSSB-SUL of the PCI-1;

corresponding to the method 2.2 described above, selecting a 2-step RACH in a case that the RSRP measurement value of the target transmission node is greater than a second threshold value configured by the network device, otherwise, selecting a 4-step RACH, where, for example, the second threshold value may be understood as an msgA-RSRP-Threshold of the PCI-1; or corresponding to the method 2.3 described above, selecting, in a case that an RSRP of a downlink signal corresponding to a random access resource of the target transmission node exceeds a third threshold value configured by the network device, the random access resource corresponding to the downlink signal to initiate the random access process, where, for example, the third threshold value may be understood as an rsrp-ThresholdSSB of the PCI-1.

Figure 3:
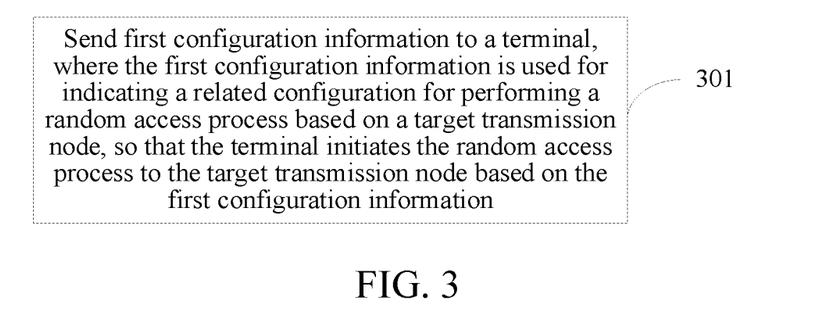
FIG. 3 is a flowchart of a random access processing method according to an embodiment of the present disclosure.

FIG. 3 is a flowchart of a random access processing method according to an embodiment of the present disclosure. The method is performed by a network device, and as shown in FIG. 3, includes the following steps:

Step 301: Send first configuration information to a terminal, where the first configuration information is used for indicating a related configuration for performing a random access process based on a target transmission node, so that the terminal initiates the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

In some embodiments, the first configuration information includes at least one of the following:

a downlink path loss reference signal;

a measurement threshold for a selection of an uplink carrier;

a measurement threshold for a selection of a random access process type; or a measurement threshold of a reference signal corresponding to a random access resource.

In some embodiments, the first configuration information is further used for indicating the target transmission node.

In some embodiments, the random access process satisfies at least one of the following:

using a measurement result of the downlink path loss reference signal of the target transmission node as a measurement result for the random access process;

using, in a case that an RSRP measurement value of a reference signal received power of the target transmission node is less than a first preset threshold, a supplementary uplink to initiate the random access process;

using, in a case that the RSRP measurement value of the target transmission node is greater than or equal to the first preset threshold, a normal uplink to initiate the random access process;

using, in a case that the RSRP measurement value of the target transmission node is greater than a second preset threshold, a 2-step physical random access channel to initiate the random access process;

using, in a case that the RSRP measurement value of the target transmission node is less than or equal to the second preset threshold, a 4-step physical random access channel to initiate the random access process; or using, in a case that an RSRP of a target signal is greater than or equal to a third preset threshold, a random access resource corresponding to the target signal to initiate the random access process, where the target signal is a downlink signal corresponding to a random access resource of the target transmission node.

In some embodiments, the method further includes:

sending second configuration information to the terminal, where the second configuration information carries a physical identifier corresponding to each transmission node, where the physical identifier includes at least one of the following:

a physical cell identifier;

a reference signal identifier;

a port number identifier corresponding to a reference signal;

a resource position identifier of a control channel;

a reference signal identifier of the control channel; or a port number identifier corresponding to a reference signal of the control channel.

It should be noted that, this embodiment is an implementation of the network device corresponding to the embodiment shown in FIG. 2. For the specific implementation, reference may be made to the related description of the embodiment shown in FIG. 2, and the same beneficial effects can be achieved. To avoid repetition, details are not described herein again.

Figure 4:
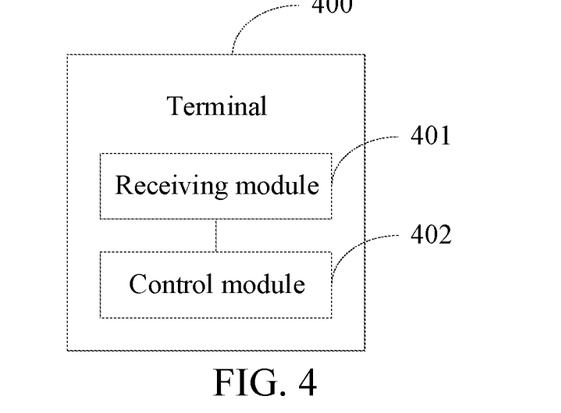
FIG. 4 is a structural diagram of a terminal according to an embodiment of the present disclosure.

FIG. 4 is a structural diagram of a terminal according to an embodiment of the present disclosure. As shown in FIG. 4, the terminal 400 includes:

a receiving module 401, configured to receive first configuration information, where the first configuration information is used for indicating a related configuration for performing a random access process based on a target transmission node; and a control module 402, configured to initiate the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

In some embodiments, the first configuration information includes at least one of the following:
 a downlink path loss reference signal;
 a measurement threshold for a selection of an uplink carrier;
 a measurement threshold for a selection of a random access process type; or
 a measurement threshold of a reference signal corresponding to a random access resource.

In some embodiments, the first configuration information is further used for indicating the target transmission node.

In some embodiments, the random access process satisfies at least one of the following:
 using a measurement result of the downlink path loss reference signal of the target transmission node as a measurement result for the random access process;
 using, in a case that an RSRP measurement value of a reference signal received power of the target transmission node is less than a first preset threshold, a supplementary uplink to initiate the random access process;
 using, in a case that the RSRP measurement value of the target transmission node is greater than or equal to the first preset threshold, a normal uplink to initiate the random access process;
 using, in a case that the RSRP measurement value of the target transmission node is greater than a second preset threshold, a 2-step physical random access channel to initiate the random access process;
 using, in a case that the RSRP measurement value of the target transmission node is less than or equal to the second preset threshold, a 4-step physical random access channel to initiate the random access process; or
 using, in a case that an RSRP of a target signal is greater than or equal to a third preset threshold, a random access resource corresponding to the target signal to initiate the random access process, where the target signal is a downlink signal corresponding to a random access resource of the target transmission node.

In some embodiments, the terminal 400 further includes:
 a determining module, configured to determine the target transmission node according to a target rule agreed in a protocol or configured by a network device.

In some embodiments, the target rule includes any one of the following:
 the target transmission node is a transmission node with a best measurement result among N transmission nodes;
 the target transmission node is any one of M transmission nodes, the M transmission nodes are transmission nodes whose measurement results are greater than or equal to a first preset value among the N transmission nodes, and M is a positive integer less than or equal to N;
 the target transmission node is a preset transmission node among the N transmission nodes in a case that a measurement result of the target object is greater than or equal to a second preset value; or
 the target transmission node is the preset transmission node among the N transmission nodes in a case that the measurement result of the target object is less than or equal to a third preset value.

In some embodiments, a time of determining the target transmission node satisfies any one of the following:
 before a selection of an uplink carrier;
 after the selection of the uplink carrier, and before a selection of a random access process type;
 after the selection of the random access process type, and before a selection of a downlink reference signal corresponding to a random access resource; or
 after the selection of the downlink reference signal corresponding to the random access resource.

In some embodiments, in a case that the time of determining the target transmission node is after the selection of the uplink carrier and before the selection of the random access process type, the random access process satisfies at least one of the following:
 using, in a case that an RSRP measurement value of a reference signal received power of the target transmission node is less than a first preset threshold, a supplementary uplink to initiate the random access process; or
 using, in a case that the RSRP measurement value of the target transmission node is greater than or equal to the first preset threshold, a normal uplink to initiate the random access process.

In some embodiments, in a case that the time of determining the target transmission node is after the selection of the random access process type and before the selection of the downlink reference signal corresponding to the random access resource, the random access process satisfies at least one of the following:
 using, in a case that the RSRP measurement value of the target transmission node is greater than a second preset threshold, a 2-step physical random access channel to initiate the random access process; or
 using, in a case that the RSRP measurement value of the target transmission node is less than or equal to the second preset threshold, a 4-step physical random access channel to initiate the random access process.

In some embodiments, in a case that the time of determining the target transmission node is after the selection of the downlink reference signal corresponding to the random access resource, the random access process satisfies the following:
 using, in a case that an RSRP of a target signal is greater than or equal to a third preset threshold, a random access resource corresponding to the target signal to initiate the random access process, where the target signal is a downlink signal corresponding to a random access resource of the target transmission node.

In some embodiments, the random access process satisfies the following:
 using a measurement result of the downlink path loss reference signal of the target transmission node as a measurement result for the random access process.

In some embodiments, the receiving module 401 is further configured to: receive second configuration information, where the second configuration information carries a physical identifier corresponding to each transmission node, where the physical identifier includes at least one of the following:
 a physical cell identifier;
 a reference signal identifier;
 a port number identifier corresponding to a reference signal;
 a resource position identifier of a control channel;
 a reference signal identifier of the control channel; or
 a port number identifier corresponding to a reference signal of the control channel.

The terminal provided in this embodiment of the present disclosure can implement various processes implemented by the terminal in the method embodiment of FIG. 2. To avoid repetition, details are not described herein again.

Figure 5:
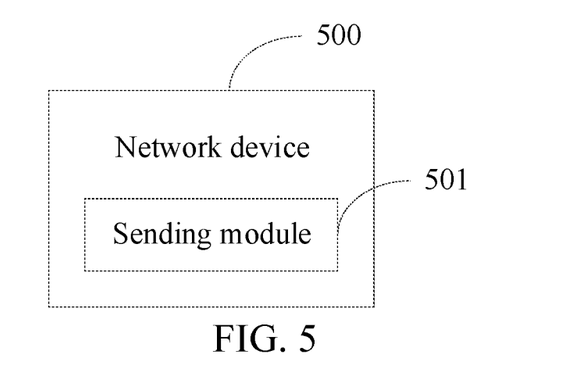
FIG. 5 is a structural diagram of a network device according to an embodiment of the present disclosure.

FIG. 5 is a structural diagram of a network device according to an embodiment of the present disclosure. As shown in FIG. 5, the network device 500 includes:

a sending module 501, configured to send first configuration information to a terminal, where the first configuration information is used for indicating a related configuration for performing a random access process based on a target transmission node, so that the terminal initiates the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

In some embodiments, the first configuration information includes at least one of the following:
  a downlink path loss reference signal;
  a measurement threshold for a selection of an uplink carrier;
  a measurement threshold for a selection of a random access process type; or
  a measurement threshold of a reference signal corresponding to a random access resource.

In some embodiments, the first configuration information is further used for indicating the target transmission node.

In some embodiments, the random access process satisfies at least one of the following:
  using a measurement result of the downlink path loss reference signal of the target transmission node as a measurement result for the random access process;
  using, in a case that an RSRP measurement value of a reference signal received power of the target transmission node is less than a first preset threshold, a supplementary uplink to initiate the random access process;
  using, in a case that the RSRP measurement value of the target transmission node is greater than or equal to the first preset threshold, a normal uplink to initiate the random access process;
  using, in a case that the RSRP measurement value of the target transmission node is greater than a second preset threshold, a 2-step physical random access channel to initiate the random access process;
  using, in a case that the RSRP measurement value of the target transmission node is less than or equal to the second preset threshold, a 4-step physical random access channel to initiate the random access process; or
  using, in a case that an RSRP of a target signal is greater than or equal to a third preset threshold, a random access resource corresponding to the target signal to initiate the random access process, where the target signal is a downlink signal corresponding to a random access resource of the target transmission node.

In some embodiments, the sending module 501 is further configured to: send second configuration information to the terminal, where the second configuration information carries a physical identifier corresponding to each transmission node, where the physical identifier includes at least one of the following:
  a physical cell identifier;
  a reference signal identifier;
  a port number identifier corresponding to a reference signal;
  a resource position identifier of a control channel;
  a reference signal identifier of the control channel; or
  a port number identifier corresponding to a reference signal of the control channel.

The network device provided in this embodiment of the present disclosure can implement various processes implemented by the network device in the method embodiment of FIG. 3. To avoid repetition, details are not described herein again.

Figure 6:
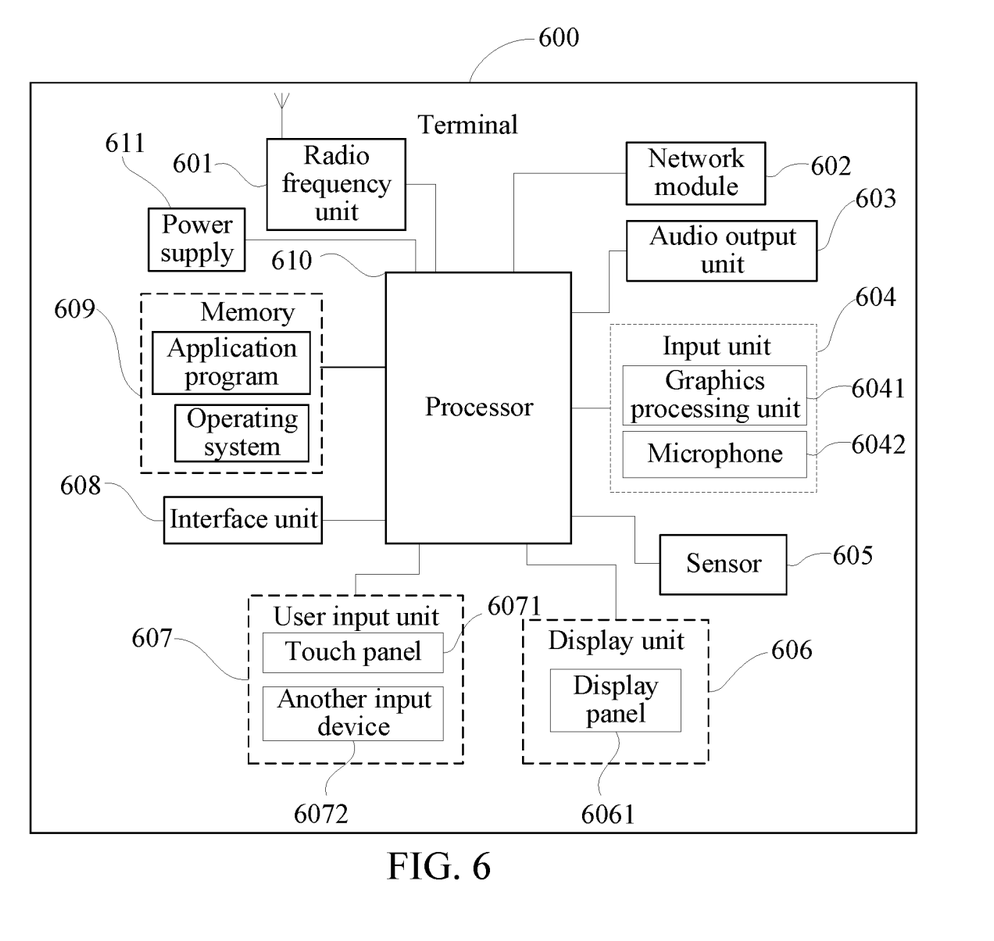
FIG. 6 is a structural diagram of another terminal according to an embodiment of the present disclosure.

FIG. 6 is a schematic diagram of a hardware structure of a terminal for implementing various embodiments of the present disclosure.

The terminal 600 includes, but is not limited to, components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the terminal structure shown in FIG. 6 does not constitute a limitation on the terminal, and the terminal may include more or fewer components than shown, or combine some components, or have different component arrangements. In the embodiments of the present disclosure, the terminal includes, but is not limited to, a mobile phone, a tablet computer, a notebook computer, a handheld computer, an in-vehicle terminal, a wearable device, a pedometer, and the like.

The radio frequency unit 601 is configured to receive first configuration information, where the first configuration information is used for indicating a related configuration for performing a random access process based on a target transmission node.

The processor 610 is configured to initiate the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

It should be understood that, in this embodiment, the processor 610 and the radio frequency unit 601 described above can implement the processes implemented by the terminal in the method embodiment of FIG. 2. To avoid repetition, details are not described herein again.

It should be understood that in the embodiments of the present disclosure, the radio frequency unit 601 may be configured to send and receive a signal during an information receiving and sending process or a call process. In some embodiments, the radio frequency unit receives downlink data from a base station, and then delivers the downlink data to the processor 610 for processing; and in addition, sends uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 may further communicate with the network and another device through a wireless communications system.

The terminal may provide, by using the network module 602, wireless broadband Internet access for a user, for example, help the user to receive or send an email, browse a webpage, and access stream media.

The audio output unit 603 may convert audio data received by the radio frequency unit 601 or the network module 602 or stored on the memory 609 into audio signals and output the audio signals as sounds. In addition, the audio output unit 603 may further provide audio output related to specific functions implemented by the terminal 600 (for example, a call signal receiving sound and a message receiving sound). The audio output unit 603 includes a speaker, a buzzer, a receiver, and the like.

The input unit 604 is configured to receive an audio or video signal. The input unit 604 may include a Graphics Processing Unit (GPU) 6041 and a microphone 6042. The graphics processing unit 6041 performs processing on image data of a static picture or a video that is obtained by an image capture device (for example, a camera) in a video capture mode or an image capture mode. An image frame that has been processed may be displayed on the display unit 606. An image frame that has been processed by the graphics processing unit 6041 may be stored in the memory 609 (or another storage medium) or sent by using the radio frequency unit 601 or the network module 602. The microphone 6042 may receive a sound, and can process the sound into audio data. The processed audio data may be converted, in a phone talk mode, into a format that may be sent to a mobile communication base station via the radio frequency unit 601 for output.

The terminal 600 further includes at least one sensor 605 such as an optical sensor, a motion sensor, or another sensor. In some embodiments, the optical sensor includes an ambient light sensor and a proximity sensor. The ambient light sensor may adjust luminance of the display panel 6061 according to brightness of the ambient light. The proximity sensor may switch off the display panel 6061 and/or backlight when the terminal 600 is moved to the ear. As one type of motion sensor, an accelerometer sensor can detect magnitudes of accelerations in various directions (generally, on three axes), may detect a magnitude and a direction of the gravity when static, and may be applied to recognizing the attitude of the terminal (for example, switching between landscape orientation and portrait orientation, a related game, and magnetometer attitude calibration), a function related to vibration recognition (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 606 is configured to display information input by the user or information provided for the user. The display unit 606 may include a display panel 6061, and the display panel 6061 may be configured by using a Liquid Crystal Display (LCD), an Organic Light-Emitting Diode (OLED), or the like.

The user input unit 607 may be configured to receive input digit or character information, and generate a keyboard signal input related to the user setting and function control of the terminal. In some embodiments, the user input unit 607 includes a touch panel 6071 and another input device 6072. The touch panel 6071, also referred to as a touchscreen, may collect a touch operation of a user on or near the touch panel (such as an operation of a user on or near the touch panel 6071 by using any suitable object or attachment, such as a finger or a touch pen). The touch panel 6071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 610. Moreover, the touch controller may receive and execute a command transmitted from the processor 610. In addition, the touch panel 6071 may be implemented by using various types, such as a resistive type, a capacitive type, an infrared type, and a surface acoustic wave type. In addition to the touch panel 6071, the user input unit 607 may further include the another input device 6072. In some embodiments, the another input device 6072 may include, but not limited to, a physical keyboard, a functional key (such as a volume control key or a switch key), a track ball, a mouse, and a joystick, which are not described herein in detail.

Further, the touch panel 6071 may cover the display panel 6061. After detecting a touch operation on or near the touch panel 6071, the touch panel transfers the touch operation to the processor 610, to determine a type of a touch event. Then, the processor 610 provides a corresponding visual output on the display panel 6061 according to the type of the touch event. In FIG. 6, the touch panel 6071 and the display panel 6061 implement, as two independent parts, input and output functions of the terminal. However, in some embodiments, the touch panel 6071 and the display panel 6061 may be integrated to implement the input and output functions of the terminal. The details are not limited herein.

The interface unit 608 is an interface for connecting an external apparatus and the terminal 600. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 608 may be configured to receive input (for example, data information or power) from an external apparatus and transmit the received input to one or more elements in the terminal 600 or may be configured to transmit data between the terminal 600 and the external apparatus.

The memory 609 may be configured to store a software program and various data. The memory 609 may mainly include a program storage area and a data storage area. The program storage area may store an operating system, an application program required by at least one function (such as a sound playback function and an image display function), and the like. The data storage area may store data (for example, audio data and an address book) created according to the use of the mobile phone, and the like. In addition, the memory 609 may include a high speed random access memory, and may further include a non-volatile memory, such as at least one magnetic disk storage device, a flash memory or another volatile solid-state storage device.

The processor 610 is a control center of the terminal, and connects to various parts of the terminal by using various interfaces and lines. By running or executing the software program and/or module stored in the memory 609, and invoking data stored in the memory 609, the processor performs various functions and data processing of the terminal, thereby performing overall monitoring on the terminal. The processor 610 may include one or more processing units. In some embodiments, the processor 610 may integrate an application processor and a modem processor. The application processor mainly processes an operating system, a user interface, an application program, and the like. The modem processor mainly processes wireless communication. It may be understood that the foregoing modem processor may not be integrated into the processor 610.

The terminal 600 may further include the power supply 611 (such as a battery) for supplying power to the components. In some embodiments, the power supply 611 may be logically connected to the processor 610 by using a power management system, thereby implementing functions such as charging, discharging, and power consumption management by using the power management system.

In addition, the terminal 600 includes some functional module that are not shown, which are not described herein in detail.

The embodiments of the present disclosure further provide a terminal, including a processor 610, a memory 609, and a computer program stored on the memory 609 and executable by the processor 610, where the computer program, when executed by the processor 610, implements the processes of the embodiments of the random access method described above, and can achieve the same technical effects. To avoid repetition, details are not described herein again.

Figure 7:
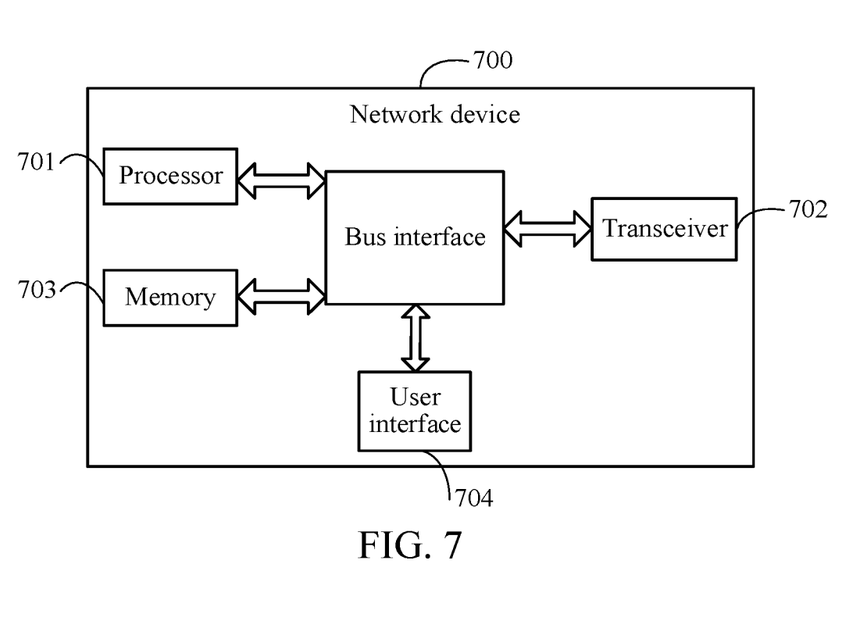
FIG. 7 is a structural diagram of another network device according to an embodiment of the present disclosure.

FIG. 7 is a structural diagram of another network device according to an embodiment of the present disclosure. As shown in FIG. 7, the network device 700 includes: a processor 701, a transceiver 702, a memory 703, and a bus interface.

The transceiver 702 is configured to send first configuration information to a terminal, where the first configuration information is used for indicating a related configuration for performing a random access process based on a target transmission node, so that the terminal initiates the random access process to the target transmission node based on the first configuration information.

The terminal is configured with a target object corresponding to N transmission nodes, the target object is a serving cell or a bandwidth part, and N is an integer greater than 1. The target transmission node is any one of the N transmission nodes.

It should be understood that, in this embodiment, the processor 701 and the transceiver 702 described above can implement the processes implemented by the network device in the method embodiment of FIG. 3. To avoid repetition, details are not described herein again.

In FIG. 7, a bus architecture may include any quantity of interconnected buses and bridges, and connects together circuits that are of one or more processors represented by the processor 701 and of a memory represented by the memory 703. The bus architecture may further connect various other circuits of a peripheral device, a voltage regulator, a power management circuit, and the like. This is well known in the art, and therefore, no further description is provided in this specification. The bus interface provides an interface. The transceiver 702 may be a plurality of components, including a transmitter and a receiver, and providing units for communicating with various other apparatuses on a transmission medium. For different UEs, the user interface 704 may be an interface capable of externally or internally connecting a required device, the connected device includes, but not limited to, a keypad, a display, a speaker, a microphone, and a joystick.

The processor 701 is responsible for the management of the bus architecture and normal processing, and the memory 703 may store data used when the processor 701 performs an operation.

The embodiments of the present disclosure further provide a network device, including a processor 701, a memory 703, and a computer program stored on the memory 703 and executable by the processor 701, where the computer program, when executed by the processor 701, implements the processes of the embodiments of the random access processing method described above, and can achieve the same technical effects. To avoid repetition, details are not described herein again.

The embodiments of the present disclosure further provide a computer-readable storage medium, storing a computer program, where the computer program, when executed by a processor, implements the processes of the embodiments of the random access processing method of a network device side provided in the embodiments of the present disclosure, or the processes of the embodiments of the random access method of a terminal device provided in the embodiments of the present disclosure, and can achieve the same technical effects. To avoid repetition, details are not described herein again. The computer-readable storage medium is, for example, a Read-Only Memory (ROM), a Random Access Memory (RAM), a magnetic disk, an optical disc, or the like.

It should be noted that, terms "include", "comprise", and any variants thereof in this specification are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented by software and a necessary general hardware platform, and certainly, may also be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

What is claimed is:

1. A random access method, performed by a terminal, comprising:
    receiving first configuration information, wherein the first configuration information is used for indicating a related configuration for performing a random access process based on a target transmission node;
    determining the target transmission node at either of:
        after a selection of a random access process type, and before a selection of a downlink reference signal corresponding to a random access resource; or
        after the selection of the downlink reference signal corresponding to the random access resource; and initiating the random access process to the target transmission node based on the first configuration information, wherein:
the terminal is configured with a target object corresponding to N transmission nodes, the target object is a serving cell or a bandwidth part, and N is an integer greater than 1; and
the target transmission node is any one of the N transmission nodes.

2. The random access method according to claim 1, wherein the first configuration information comprises at least one of the following:
a downlink path loss reference signal;
a measurement threshold for a selection of an uplink carrier;
a measurement threshold for a selection of a random access process type; or
a measurement threshold of a reference signal corresponding to a random access resource.

3. The random access method according to claim 1, wherein the first configuration information is further used for indicating the target transmission node.

4. The random access method according to claim 3, wherein the random access process satisfies at least one of the following:
using a measurement result of the downlink path loss reference signal of the target transmission node as a measurement result for the random access process;
using, when a reference signal received power (RSRP) measurement value of the target transmission node is less than a first preset threshold, a supplementary uplink to initiate the random access process;
using, when the RSRP measurement value of the target transmission node is greater than or equal to the first preset threshold, a normal uplink to initiate the random access process;
using, when the RSRP measurement value of the target transmission node is greater than a second preset threshold, a 2-step physical random access channel to initiate the random access process;
using, when the RSRP measurement value of the target transmission node is less than or equal to the second preset threshold, a 4-step physical random access channel to initiate the random access process; or
using, when an RSRP of a target signal is greater than or equal to a third preset threshold, a random access resource corresponding to the target signal to initiate the random access process, wherein the target signal is a downlink signal corresponding to a random access resource of the target transmission node.

5. The random access method according to claim 1, wherein the target transmission node is determined according to a target rule agreed in a protocol or configured by a network device.

6. The random access method according to claim 1, wherein the target rule comprises any one of the following:
the target transmission node is a transmission node with a best measurement result among N transmission nodes;
the target transmission node is any one of M transmission nodes, the M transmission nodes are transmission nodes whose measurement results are greater than or equal to a first preset value among the N transmission nodes, and M is a positive integer less than or equal to N;
the target transmission node is a preset transmission node among the N transmission nodes in a case that a measurement result of the target object is greater than or equal to a second preset value; or
the target transmission node is the preset transmission node among the N transmission nodes in a case that the measurement result of the target object is less than or equal to a third preset value.

7. The random access method according to claim 1, wherein when the time of determining the target transmission node is after the selection of the random access process type and before the selection of the downlink reference signal corresponding to the random access resource, the random access process satisfies at least one of the following:
using, when a reference signal received power (RSRP) measurement value of the target transmission node is greater than a second preset threshold, a 2-step physical random access channel to initiate the random access process; or
using, when the RSRP measurement value of the target transmission node is less than or equal to the second preset threshold, a 4-step physical random access channel to initiate the random access process.

8. The random access method according to claim 1, wherein when the time of determining the target transmission node is after the selection of the downlink reference signal corresponding to the random access resource, the random access process satisfies the following:
using, when a reference signal received power (RSRP) of a target signal is greater than or equal to a third preset threshold, a random access resource corresponding to the target signal to initiate the random access process, wherein the target signal is a downlink signal corresponding to a random access resource of the target transmission node.

9. The random access method according to claim 1, wherein the random access process satisfies the following:
using a measurement result of the downlink path loss reference signal of the target transmission node as a measurement result for the random access process.

10. The random access method according to claim 1, further comprising:
receiving second configuration information, wherein the second configuration information carries a physical identifier corresponding to each transmission node, wherein the physical identifier comprises at least one of the following:
a physical cell identifier;
a reference signal identifier;
a port number identifier corresponding to a reference signal;
a resource position identifier of a control channel;
a reference signal identifier of the control channel; or
a port number identifier corresponding to a reference signal of the control channel.

11. A terminal, comprising:
a memory storing a computer program; and
a processor coupled to the memory and configured to execute the computer program to perform operations comprising:
receiving first configuration information, wherein the first configuration information is used for indicating a related configuration for performing a random access process based on a target transmission node;
determining the target transmission node at either of:
after a selection of a random access process type, and before a selection of a downlink reference signal corresponding to a random access resource; or after the selection of the downlink reference signal corresponding to the random access resource; and initiating the random access process to the target transmission node based on the first configuration information, wherein:

the terminal is configured with a target object corresponding to N transmission nodes, the target object is a serving cell or a bandwidth part, and N is an integer greater than 1; and the target transmission node is any one of the N transmission nodes.

12. The terminal according to claim 11, wherein the first configuration information comprises at least one of the following:

a downlink path loss reference signal;

a measurement threshold for a selection of an uplink carrier;

a measurement threshold for a selection of a random access process type; or a measurement threshold of a reference signal corresponding to a random access resource.

13. The terminal according to claim 11, wherein the first configuration information is further used for indicating the target transmission node.

14. The terminal according to claim 13, wherein the random access process satisfies at least one of the following:

using a measurement result of the downlink path loss reference signal of the target transmission node as a measurement result for the random access process;

using, when a reference signal received power (RSRP) measurement value of the target transmission node is less than a first preset threshold, a supplementary uplink to initiate the random access process;

using, when the RSRP measurement value of the target transmission node is greater than or equal to the first preset threshold, a normal uplink to initiate the random access process;

using, when the RSRP measurement value of the target transmission node is greater than a second preset threshold, a 2-step physical random access channel to initiate the random access process;

using, when the RSRP measurement value of the target transmission node is less than or equal to the second preset threshold, a 4-step physical random access channel to initiate the random access process; or using, when an RSRP of a target signal is greater than or equal to a third preset threshold, a random access resource corresponding to the target signal to initiate the random access process, wherein the target signal is a downlink signal corresponding to a random access resource of the target transmission node.

15. The terminal according to claim 11, wherein the target transmission node is determined according to a target rule agreed in a protocol or configured by a network device.

16. The terminal according to claim 11, wherein the target rule comprises any one of the following:

the target transmission node is a transmission node with a best measurement result among N transmission nodes;

the target transmission node is any one of M transmission nodes, the M transmission nodes are transmission nodes whose measurement results are greater than or equal to a first preset value among the N transmission nodes, and M is a positive integer less than or equal to N;

the target transmission node is a preset transmission node among the N transmission nodes in a case that a measurement result of the target object is greater than or equal to a second preset value; or the target transmission node is the preset transmission node among the N transmission nodes in a case that the measurement result of the target object is less than or equal to a third preset value.

17. A non-transitory computer-readable storage medium, storing a computer program, wherein the computer program, when executed by a processor of a terminal, causes the processor to perform operations comprising:

receiving first configuration information, wherein the first configuration information is used for indicating a related configuration for performing a random access process based on a target transmission node;

determining the target transmission node at either of:

after a selection of a random access process type, and before a selection of a downlink reference signal corresponding to a random access resource; or after the selection of the downlink reference signal corresponding to the random access resource; and initiating the random access process to the target transmission node based on the first configuration information, wherein:

the terminal is configured with a target object corresponding to N transmission nodes, the target object is a serving cell or a bandwidth part, and N is an integer greater than 1; and the target transmission node is any one of the N transmission nodes.

* * * * *